United States Patent [19]
Kuenemund et al.

[11] Patent Number: 5,317,753
[45] Date of Patent: May 31, 1994

[54] COORDINATE ROTATION DIGITAL COMPUTER PROCESSOR (CORDIC PROCESSOR) FOR VECTOR ROTATIONS IN CARRY-SAVE ARCHITECTURE

[75] Inventors: Ronald Kuenemund, Dietramszell; Tobias Noll, Neufahrn, both of Fed. Rep. of Germany

[73] Assignee: Siemens Aktiengesellschaft, Munich, Fed. Rep. of Germany

[21] Appl. No.: 667,289

[22] Filed: Mar. 11, 1991

[30] Foreign Application Priority Data

Apr. 20, 1990 [DE]  Fed. Rep. of Germany ....... 4012709

[51] Int. Cl.$^5$ .............................................. G06F 7/544
[52] U.S. Cl. ................................... 395/800; 364/754; 364/DIG. 1; 364/240; 364/243
[58] Field of Search .................. 364/731, 736, 747; 395/800

[56] References Cited

U.S. PATENT DOCUMENTS

| | | | |
|---|---|---|---|
| 4,231,102 | 10/1980 | Barr et al. ........................... | 364/726 |
| 4,337,519 | 6/1982 | Nishimoto ........................... | 364/736 |
| 4,757,444 | 7/1988 | Aoyama et al. ..................... | 364/736 |
| 4,791,590 | 12/1988 | Ku et al. .............................. | 364/736 |
| 4,896,287 | 1/1990 | O'Donnell et al. ................. | 364/754 |
| 4,945,505 | 7/1990 | Wiener et al. .................. | 364/715.03 |
| 5,019,968 | 5/1991 | Wang et al. .......................... | 395/800 |

OTHER PUBLICATIONS

Hahn et al., "Cordic-Prozessover für die digitale Signzlverarbeitung", ME, vol. 3, No. 1, 1989, pp. 22-27.
Despain, Alvin M., "Fourier Transform Computers Using CORDIC Iterations", IEEE Transactions on Computers, vol. C-23, No. 10, Oct. 1974, pp. 993-1001.
Haviland et al. "Acordic Arithmetic Processor Chip", IEEE Transactions on Computers, vol. C-29, No. 2, Feb. 1980, pp. 68-79.

Primary Examiner—Robert B. Harrell
Assistant Examiner—Richard Lee Ellis
Attorney, Agent, or Firm—Hill, Steadman & Simpson

[57] ABSTRACT

A CORDIC processor is provided in carry-save architecture in connection with intense pipelining for vector rotations, particularly given problems in real-time processing. The processor comprises a plurality of vector iteration stages and a plurality of angle iteration stages that are partially redundantly present in order to guarantee a convergency of the CORDIC algorithm despite an ambiguity region in the sign detection of carry-save numbers and in order to simplify other circuit components, for example a multiplier. As a result of the carry-save architecture, only incomplete addition/subtraction operations are executed in the iteration stages, and intermediate results in the form of carry and save words are fed through the CORDIC processor on separate line paths until they are added in an adder at the processor output to form the final result vector. The invention is advantageous in the low chip surface requirement that results from a high regularity of the overall structure and from simply-constructed base cells of the vector and angle iteration stages and in the extremely-high processing speed that results from the combination of intense pipelining and the carry-save architecture.

8 Claims, 6 Drawing Sheets

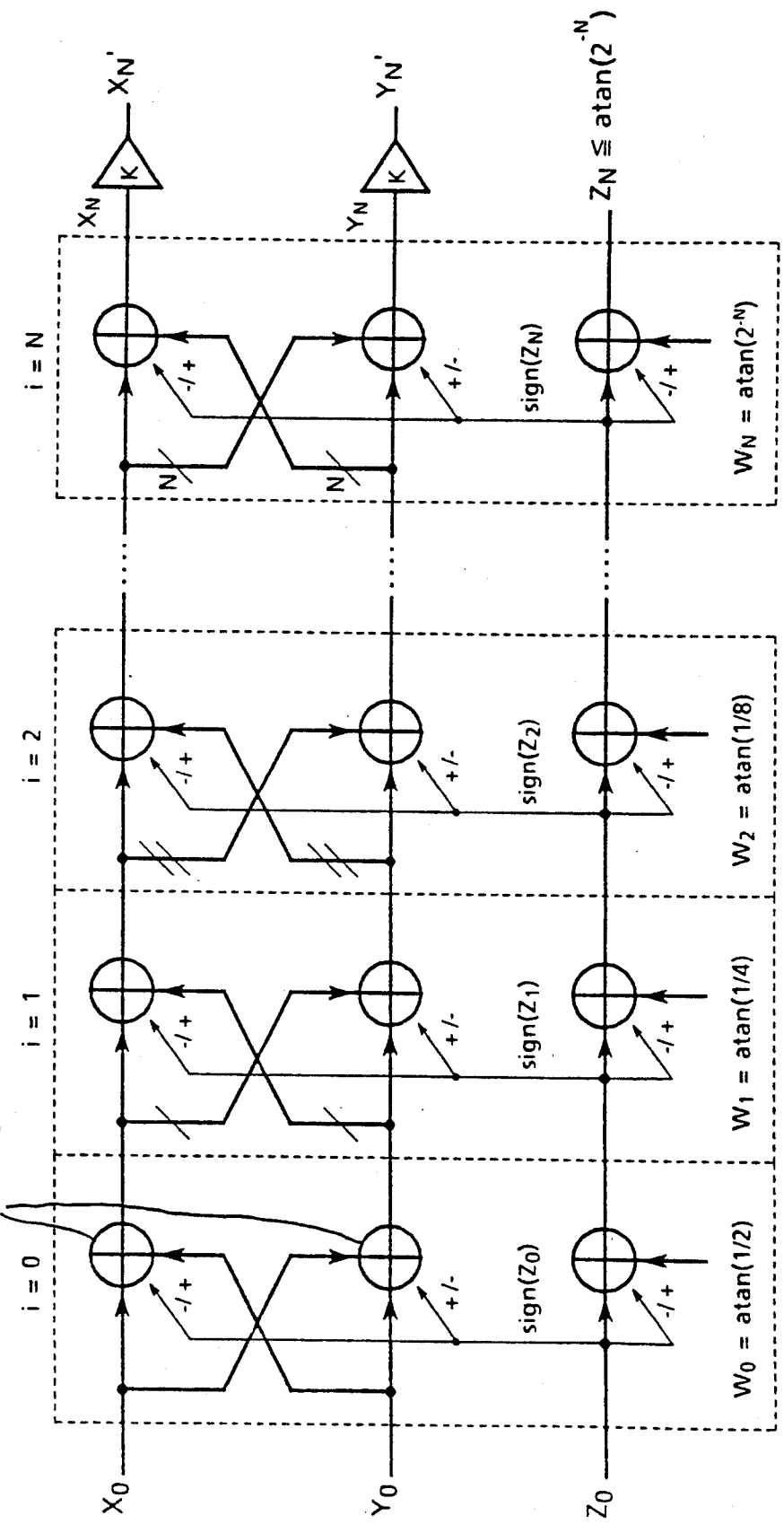

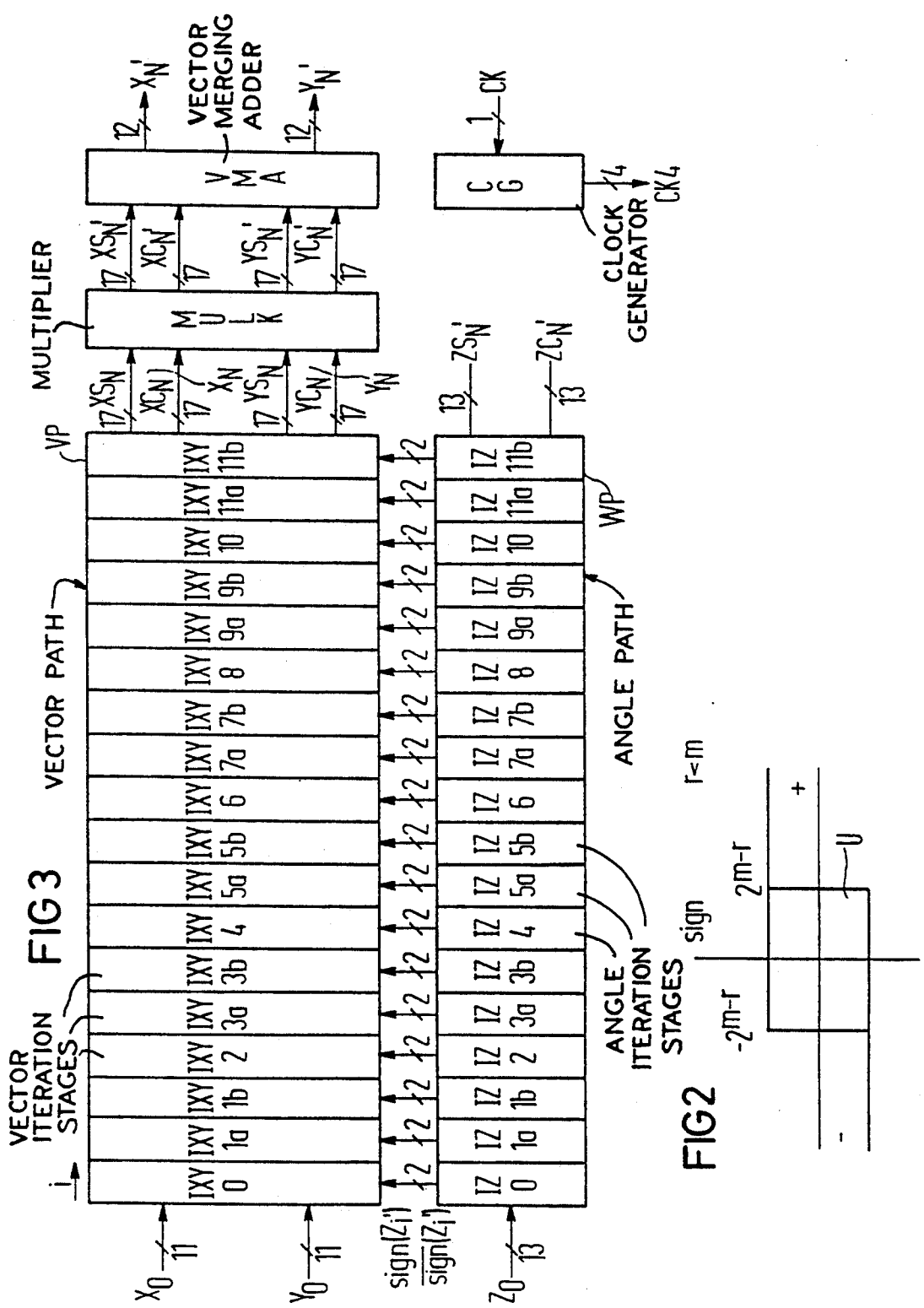

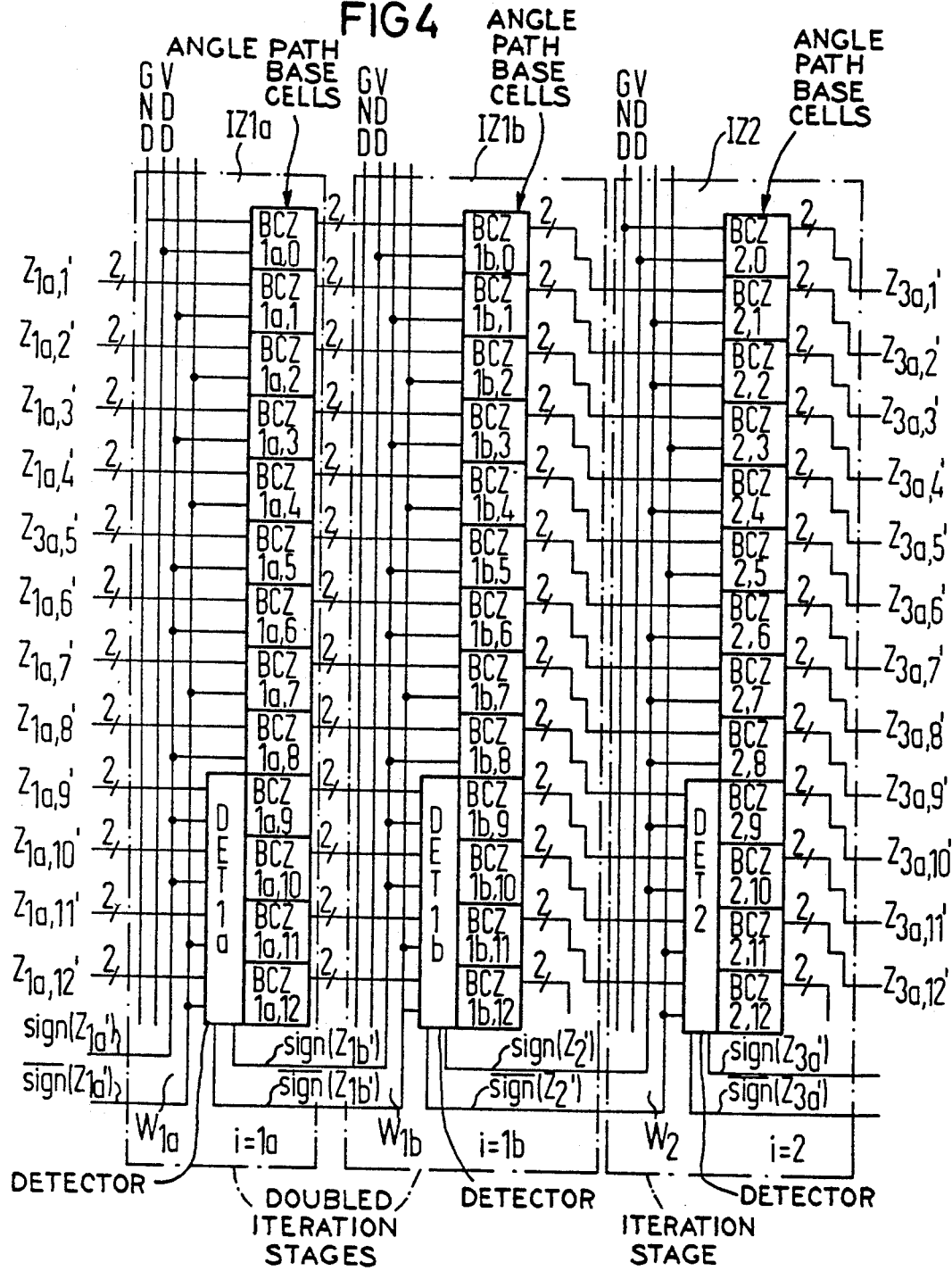

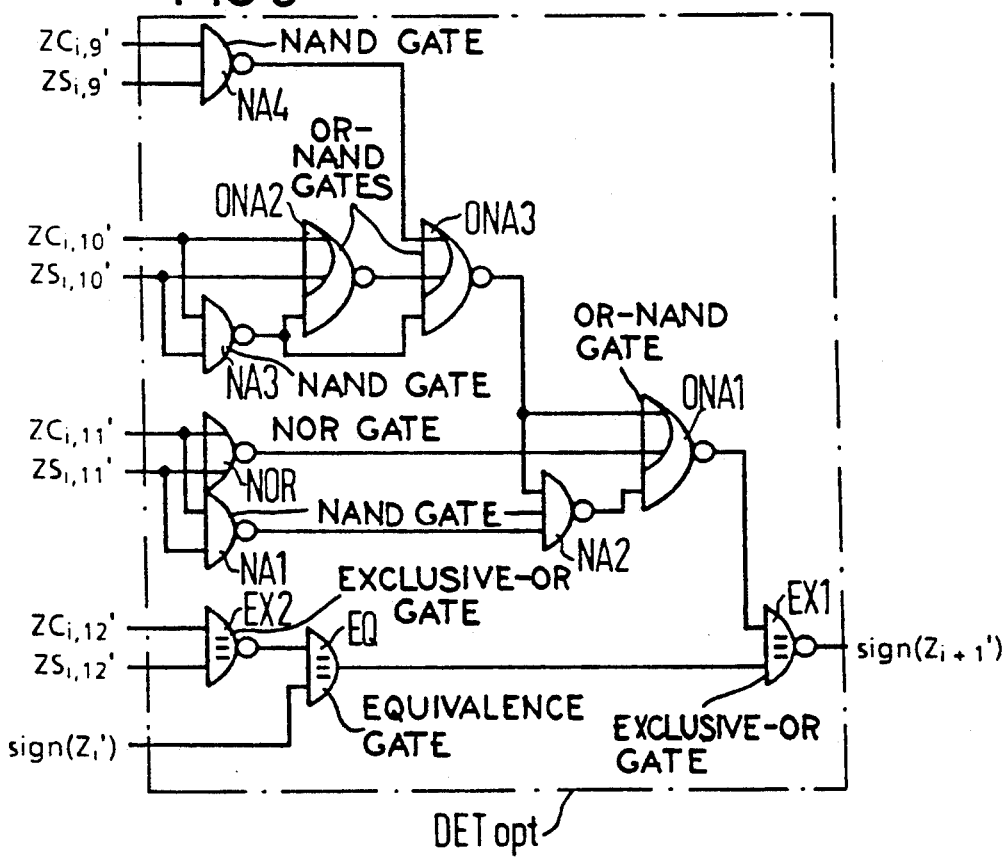

COORDINATE ROTATION DIGITAL COMPUTER PROCESSOR (CORDIC PROCESSOR) FOR VECTOR ROTATIONS IN CARRY-SAVE ARCHITECTURE

BACKGROUND OF THE INVENTION

1. Field of the Invention

The present invention relates to a computer processor, and is more particularly concerned with a coordinate rotation digital computer processor CORDIC processor, for vector rotations for solving problems of real-time processing, constructed with a carry-save architecture.

2. Description of the Prior Art

A CORDIC processor is known from the publication of Helmut Halm, et al entitled "CORDIC-Prozessoren fuer die digitale Signalverarbeitung", published in the periodical "me", Vol. 3, No. 1, 1989, pp. 22-27.

The pipeline principle and hard-wired shift operations are thereby set forth as possibilities for increasing the data rate.

SUMMARY OF THE INVENTION

The object of the present invention is to provide a CORDIC processor that is constructed of simple elementary cells, can be easily modified in view of accuracy and word width and mainly represents a good compromise between low chip surface and high data rate.

The above object is achieved, according to the present invention, by the provision of a CORDIC processor for vector rotations constructed in accordance with a carry-save architecture for solving problems of real-time processing, in which the processor comprises (a) a vector path and an angle path whereby the vector path is composed of a plurality of series-connected vector iteration stages and the angle path is composed of a plurality of series-connected angle iteration stages;

(b) a plurality of devices for mutual decoupling of the vector iteration stages and a plurality of devices for mutual decoupling of the angle iteration stages in order to enable a processing according to a conveyor belt principle known as pipelining;

(c) a plurality of vector iteration stages and a plurality of angle iteration stages that contain addition/subtraction circuits, wherein, within a clock interval, only incomplete addition/subtraction operations occur and intermediate results at the end of the clock interval in the form of a carry word and of a sum word (carry-save number) are available on separate lines for carry and sum bits at the output of each vector and angle iteration stage, these words being available for further processing;

(d) the plurality of vector iteration stages and the plurality of angle iteration stages comprising structure for realizing shift operations (multiplication with powers of 2) that allow a shift of carry and sum bits;

(e) the plurality of angle iteration stages having sign detectors that employ the carry and sum bits for sign detection;

(f) a multiplier that is connected to the output lines for the carry and sum words of a last vector iteration stage of the series for multiplying both the carry word and the sum word of each vector component by a correction factor; and (g) an adder that is connected to the output lines for the carry and sum words of a multiplier circuit that adds up the carry and sum words of both vector components to form components of a result vector.

The advantage which may be obtained in practicing the present invention is, in particular, that a significantly-improved relationship of data rate to chip surface requirement occurs in the CORDIC processor constructed in accordance with the present invention in comparison to known CORDIC processors, this resulting from the carry-save architecture, and that the data rate is independent of the overall word width.

According to a feature of the invention, the CORDIC processor set forth above is particularly characterized in that each angle iteration stage is composed of a plurality of identical angle path base cells; the sign detectors are connected parallel to angle path base cells; the input lines for angle bits of the angle path base cells are connected to lines for the non-inverted and inverted sign output signals of the respectively immediately-preceding angle iteration stage, such that this corresponds to a product formation of the sign output signal of the immediately-preceding angle iteration stage and the binary representation of a respective given, scaled negative angle step, whereby bits not modifiable by the product formation are occupied with fixed logical values; and the structures for realizing a shift operation required for scaling the carry and sum words at the output of an angle iteration stage are comprised such that the output lines for the carry-save bits of an angle path base cell are respectively connected to the outputs of the next more-significant angle path base cell of an immediately-following angle iteration stage.

According to another feature of the invention, the processor is characterized in that angle path base cells of an angle iteration stage each contain a respective full adder; that a register, respectively, for carry bit and sum bit and clock by clock signals follows the full adder for mutual decoupling of the vector iteration stages. The inputs of the angle path base cell correspond to the inputs of the full adder, whereby one input of the full adder is connected to the input line for an angle bit and two other inputs of the full adder are connected to the output lines for the carry and sum bits of the immediately-preceding angle path base cell insofar as the preceding angle path base cell exists, and are respectively connected with logical "0" in case a preceding angle path base cell does not exist. The output line for the carry bit comes from the next less-significant base cell and is only looped through the angle path base cell. The output bit line for the sum bit is connected to the output of the first register that, in turn, has its input side connected to the sum output of the full adder; and the output line for the carry bit is connected to the output of the second register for the forwarding of the next more-significant angle path base cell, the input side of the second register, in turn, being connected to the carry output of the full adder.

According to another feature of the invention, the processor is particularly characterized in that each vector iteration stage is composed of a plurality of identical vector path base cells. One vector path base cell has its input side connected to the output lines for carry and sum bits of the immediately-preceding vector path base cell insofar as the immediately-preceding angle path base cell exists and, otherwise, either the input lines for the carry bits or the input lines for the sum bits at the input side of the vector path base cell are connected to the processor input lines for inputting a starting vector. The structure for realizing a shift operation in a vector iteration stage is structured such that a respective angle path base cell has its input side connected to the output lines for carry and sum bits of an i-times more-significant, immediate-preceding vector path base cell and when such a vector path base cell does not exist, has its input side connected to the most-significant, immediately-preceding vector path base cell.

According to another feature of the invention, in the processor, a vector path base cell is composed of two multiplexers, of four full adders and of a decoupling device for decoupling the vector iteration stages, the decoupling device being in the form of ten transmission gates. An input line for the sum bit of a first vector component is connected to a first input of a first full adder and an input line for the sum bit of a second vector component is connected to a first input of a second full adder. An input line for the carry bit of a first vector component is connected to a first input of a third full adder via a first transmission gate clocked by a first clock signal and an input line for the carry bit of a second vector component is connected to a first input of a fourth full adder via a fourth transmission gate that is likewise clocked by the first clock signal. An input line for the i-fold more-significant carry bit of the second vector component is connected via the first multiplexer to a second input of the first full adder, the i-fold more-significant sum bit of the second vector component is likewise connected via the first multiplexer to the third input of the first full adder, the i-fold more-significant carry bit of the first vector component is connected via the second multiplexer to a second input of the second full adder and the i-fold more-significant sum bit of the first vector component is connected to the third input of the second full adder, likewise via the second multiplexer, whereby the multiplexers invert or do not invert the carry and sum bits dependent on the sign signals of the immediately-preceding vector iteration stage. The sum output of the first full adder is connected via the second transmission gate to a second input of the third full adder and the sum output of the second full adder is connected via a fifth transmission gate to a second input of the fourth full adder, whereby both of the second and fifth transmission gates are clocked by the first clock signal. An output line for a first-stage carrier bit of a vector component is connected via a third transmission gate to the carry output of the first full adder and an output line for a first-stage carrier bit of the second vector component is connected via a sixth transmission gate to the carry output of the second full adder, whereby both of the third and sixth transmission gates are clocked by the first clock signal. An input line for a first-stage carry bit of a vector component from the next less-significant vector path base cell is connected to a third input of the third full adder and an input line for a first-stage carry bit of a vector component for the next less-significant vector path base cell is connected to the third input of the third full adder and an input line for a first-stage carrier bit from the second vector component of the next less-significant vector base path cell is connected to the third input of the fourth full adder. The input lines for the second-stage carry bits of the vector components from the next less-significant vector path base cell are looped through onto the output lines for the immediate-following vector iteration stage of the vector path base cell. The sum output of the third full adder is connected via a seventh transmission gate to the output line for the sum bit of a first component of the immediately-following iteration stage and the sum output of the fourth full adder is connected via a ninth transmission gate to the output line for the sum bit of the second component of the immediately-following vector iteration stage, whereby the seventh and ninth transmission gates are clocked by a second clock signal. An output line for a second-stage carry bit of a first vector component is connected via an eighth transmission gate to the carry output of a third full adder and an output line for a second-stage carry bit of the second vector component is connected via a tenth transmission gate and to the carry output of the first full adder, whereby the eighth and tenth transmission gates are clocked by the second clock signal.

According to another feature of the invention, the processor is particularly characterized in that at least one vector path iteration stage is redundantly arranged, for example, in order with a given accuracy of the final result vector to allow greater ambiguity regions in the sign detection in the individual angle iteration stages and in order to simultaneously enable an identical correction factor for all combinations of processor input signals.

According to another feature of the invention, the processor is particularly characterized in that the number of redundantly-arranged vector and angle iteration stages is of such a magnitude that, at most, the foremost-significant carry and sum bits and a sign output signal of the respective immediately-preceding angle iteration stage are required for sign detection in order to enable an optimized sign detector which is identical for all angle iteration stages and which is more simply constructed than a combination of full adders.

According to another feature of the invention, the processor as featured above, is particularly characterized in that an identical, optimized sign detector for all angle iteration stages forms a sign output signal from the foremost-significant carry and sum bits of an immediately-preceding angle iteration stage and from the non-inverted sign output signal of an immediately-preceding angle iteration stage in that the sign output signal of the immediately-preceding angle iteration stage is connected to one of two inputs of an equivalence element and the output of the equivalence element is connected to one of two inputs of a first EXOR (EXCLUSIVE-OR) gate; the most significant carry and sum bits are operated with a second EXOR gate and the output of the second EXOR gate is connected to the second of the two inputs of the equivalence elements; the second most-significant carry and sum bits are operated with a NOR gate, whereby the output of the NOR gate is connected to one of the two OR inputs of a first OR-NAND gate and these carry and sum bits are likewise operated with a first NAND gate. The output of the first NAND gate is connected to one of the two inputs of a second NAND gate and the output of the second NAND gate is connected to a direct NAND input of the first OR-NAND gate. The respective third most-significant carry and sum bits are operated with the input OR gate of a second OR-NAND gate, whereby the output of the second OR-NAND gate is connected to one of the two OR inputs of a third OR-NAND gate and the third most-significant carry and sum bits are operated by a third NAND gate. The output of the third NAND gate is connected to the respective direct NAND input of the second and third OR-NAND gates. The fourth most-significant carry and sum bits are operated with a fourth NAND gate, the output of the fourth NAND gate being connected to the second OR input of the third OR-NAND gate, and the output of the third OR-NAND gate being connected to the respective second OR input of the first OR-NAND gate and to the second input of the second NAND gate. The output of the first OR-NAND gate is connected to the second input of the first EXOR gate and the output of the first EXOR gate supplies the sign output signal of the optimized sign detector.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a schematic illustration of the structure for a CORDIC algorithm for vector rotations;

FIG. 2 is a schematic representation of the ambiguity region in the sign estimation of carry-save numbers;

FIG. 3 is a block diagram directed to an exemplary embodiment of a CORDIC processor for vector rotations constructed in accordance with the present invention and comprising a vector path and an angle path;

FIG. 4 is a schematic representation of an excerpted portion of the angle path of a CORDIC processor constructed in accordance with the present invention and showing angle path base cells and detectors;

FIG. 8 is a schematic logic circuit diagram of an optimized sign detector which may be employed in practicing the present invention.

DESCRIPTION OF THE PREFERRED EMBODIMENTS

Figure 5:
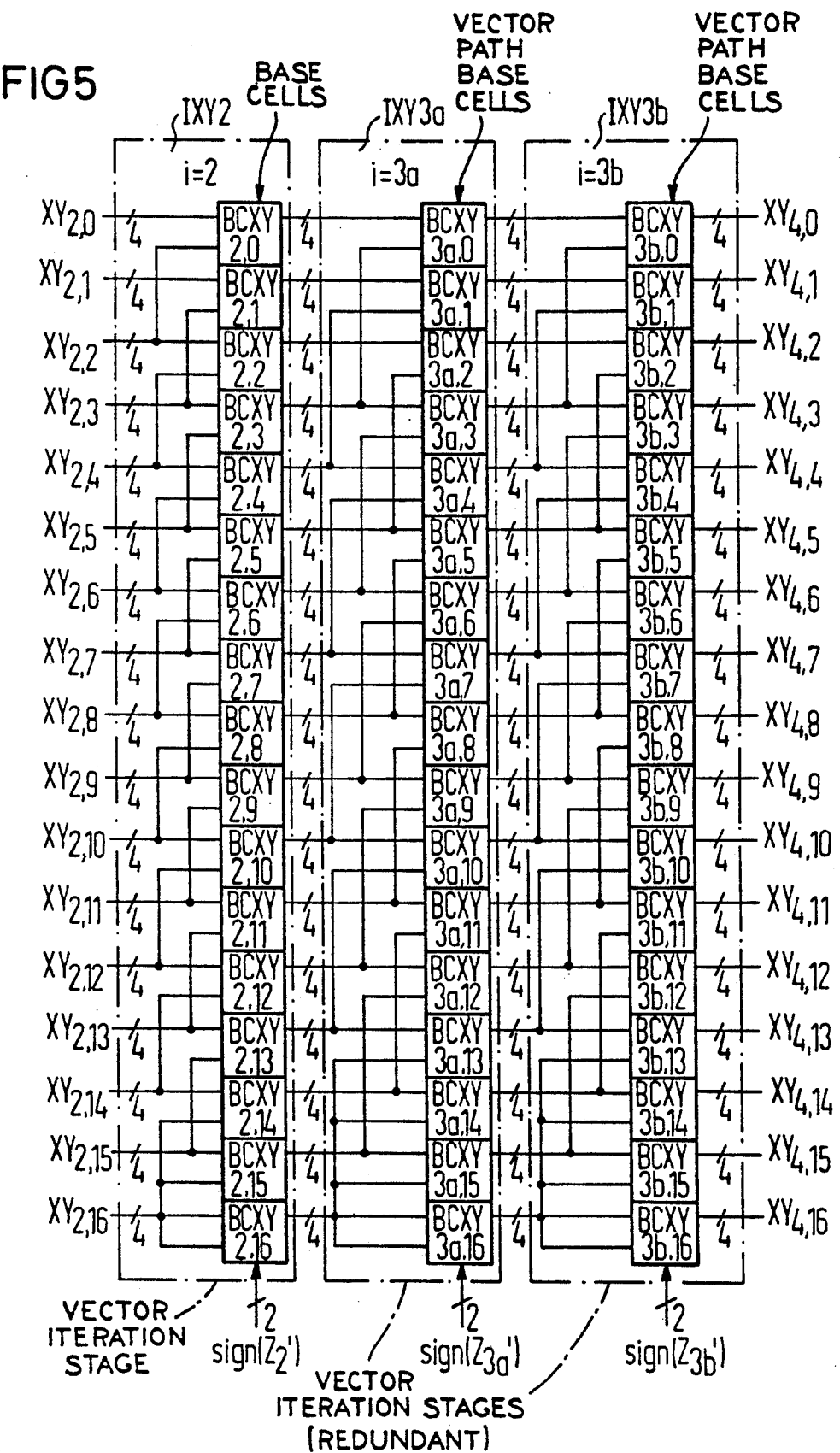
FIG. 5 is a schematic representation of an excerpted view of the vector path of FIG. 3 of the CORDIC processor constructed in accordance with the present invention showing vector path base cells.

In order to illustrate the operation of the CORDIC processor of the present invention in greater detail, the CORDIC algorithm and special characteristics in view of the sign estimating of carry-save numbers shall be briefly set forth below.

The idea of the CORDIC algorithm is to execute the rotation of a vector $P_o$ ($X_o$, $Y_o$) by the angle $Z_o$, not in one step, but to approach the rotational angle on the basis of a sum of permanently-prescribed sub-angles $alpha_i$. With a definition of the sub-angles $alpha_i$ as $$alpha = atan\ (2^{-i}),$$

the trigonometric operations needed given vector rotations are replaced by shift operations that are easy to realize (right shift of binary number by i places corresponds to the factor $2^{-i}$).

When, by continued addition or subtraction of the sub-angles $alpha_i$ via N stages, the output $Z_n$ is iterated towards zero, then the coordinates of the vector $P_o$ rotated by $Z_o$ (rotate mode) are obtained for $P_n'$ ($X_n'$, $Y_n'$).

When the aforementioned values are introduced into the general equations for a two-dimensional vector rotation, then the following equations are obtained:

$$X_N' = X_o * \cos (Z_o) - Y_o * \sin (Z_o)$$

$$Y_N' = X_o * \cos (Z_o) + X_o * \sin (Z_o)$$

The iteration equations for this can be written as:

$$X_{i+1} = X_i - Y_i * \text{sign}\ (Z_1) * 2^{-i}$$

$$Y_{i+1} = Y_i + X_i * \text{sign}\ (Z_i) * 2^{-i}$$

$$Z_{i+1} + Z_i - \text{sign}\ (Z_i) * W_i$$

where $W_i = atan\ (2^{-i})$.
Whereby, $$X_N' = X_N * K$$

$$Y_N' + Y_N * K$$

hold true for the outputs $X_n'$ and $Y_n'$, where $$\text{with } K = \left( \prod_{i=0}^{N} (1 + 2^{-2i})^{-\frac{1}{2}} \right.$$

FIG. 1 illustrates the principle of the CORDIC algorithm for vector rotations. The rotation of a vector is therefore realized by a plurality of identical stages that are composed only of adder/subtractor circuits, devices for realizing shift operations and a sign detection of $Z_i$ (sign ($Z_i$)). The iteration stage i=0 has inputs for the coordinates $X_o$ and $Y_o$ of a vector to be rotated, for the rotational angle $Z_o$ and for a $0_{th}$ angle step $W_o = atan\ (\frac{1}{2})$, whereby the sign signal (sign $Z_o$) formed from the rotation angle $Z_o$ allows the adder/subtractor circuits (identified by circles) to unambiguously become adders or subtractors. With adders and subtractors, a coupling of the vector coordinates $X_o$, $Y_o$ is achieved and a residual angle iterated to zero is formed from the rotational angle $Z_o$ and from the $0^{th}$ angular step. This is likewise true of the further stages i=1 to i=n, whereby, indicated by oblique strokes, an i-fold shift occurs and the angular steps become smaller. The vector coordinates $X_n$ and $Y_n$, in addition to a residual angle $Z_n$, are available at the output of the stage i=n.

In a carry-save architecture, the intermediate result of an addition of two's compliment numbers is represented by a sum word and by a carry word, whereby a final result arises only by the addition of the sum word and the carry word. As a result of the redundant number representation, the sign of this number cannot be unambiguously determined. The sign of a result in carry-save representation can therefore only be estimated in that a defined plurality of leading significance r are considered. FIG. 2 illustrates the ambiguity region U arising in the sign estimation, showing this ambiguity in a diagram that illustrates the sign (sign result) of the result dependent on the result value RESULT on the word width m and on the number of most significant bits r. It becomes clear from FIG. 2 that the arising ambiguity region U in the sign estimation becomes all the smaller the more leading significance are utilized for the sign decision. In order to preserve the advantage of a high data rate for the carry-save architecture independent of the overall word width, the number of significance to be considered, however, should be kept as low as possible.

FIG. 3 is a block diagram directed to an exemplary embodiment of a CORDIC processor constructed in accordance with the present invention for vector rotations. This processor is composed of a vector path VP, an angle path WP, a multiplication circuit MULK, an adder circuit VMA (vector merging adder) and a clock generator CG. The input quantities of the angle path are the components $X_o$, $Y_o$ of the start vector and the input quantity of the angle path WP is the rotational angle $Z_o$. The vector path VP is composed of angle iteration stages IXY 0 ... IXY 11b; the same holds true of the angle path WP that is of the angle iteration stages IZ 0 ... IZ 11b, whereby each of the angle iteration stages supplies sign signals sign $(Z_i')$, $\overline{\text{sign}(Z_i')}$ to the appertaining iteration stage IXY. In the exemplary embodiment shown in FIG. 3, all odd-numbered iteration stages are redundantly present and are referenced with "a" and "b" for further distinction. The output lines for carry and sum words of the two rotated vector components $X_N$, $Y_N$ of the last vector iteration stage IXY 11b are connected to the multiplier MULK and the output lines thereof for the carry and sum words $XC_N'$, $SX_N'$, $YC_N'$, $YS_N'$ of the multiplied vector are, in turn, connected to the adder circuit VMA, whereby the adder circuit VMA supplies the final result vector $X_N'$, $Y_N'$ at its outputs. In addition, FIG. 3 illustrates a clock generator CG that generates four clock signals CK 4 from a single clock signal CK.

In order to satisfy an accuracy requirement of $g = 10^{-3}$, an input word width of, respectively, eleven bits must be provided for the components $X_o$, $Y_o$ of the start vector. Given a rotational angle $Z_o$ between +pi/2 and −pi/2 and an accuracy requirement of $g = 10^{-3}$, two additional bits for places preceding the decimal point are required, so that the input word width of the rotational angle amounts to 13 bits. An internal word width of 17 bits results from the 11 bits of the input word width, one bit for the extreme case that both vector components are added, one bit for a magnification factor 1/K that results on the basis of the iteration and four bits in order to avoid rounding errors. Due to the right shifts needed in each stage, lower significance are shifted out of the presentable numerical range. So that the accuracy requirement is met at the outputs $X_N'$ and $Y_N'$ despite to these rounding errors across all stages, the internal word width must be additionally increased by four places following the decimal point. Following the adder VMA, the output word width for $X_N'$ and $Y_N'$ given the aforementioned accuracy requirement, can be respectively reduced to a minimum of 11+1 bits for adding up the vector components, which is equal to 12 bits.

The amount of the residual angle $Z_i$ becomes small from iteration stage-to-iteration stage, so that the word width in the angle path can be reduced by one bit after each stage. In order to fully exploit the existing word width in order to achieve the given accuracy and so that sign detectors DET need not be arranged shifted, a scaling of $Z_i$ with $2^i$ occurs. Applied to the equations set forth above, $$Z_{i+1}' = 2*(Z_i' + W_i')$$

where $W_i' = -\text{sign}(Z_i')*2^{i}* \text{atan}(2^{-i})$
results when the amount of the current residual angle $Z_i'$ at the output of the angle iteration stage IZi lies in the ambiguity region U of the sign decision, then a decision "zero" would have to be introduced in addition to the sign decisions "positive" and "negative", so that the values $X_i$ and $Y_i$ are not changed. The value of $Z_i'$ in this iteration stage is multiplied by 2 in accordance with the scaling, so that the amount of the residual angle again becomes so large in the next stage (or in one of the next stages) that a reliable decision "positive" or "negative" is possible. Decision errors concerning the sign of $Z_i'$ due to the ambiguity region U would therefore be impossible.

The iteration stages not implemented given a "zero decision" would then, however, also have to be taken into consideration in the calculation of correction factor K. Instead of a simple multiplication of the outputs $X_N$ and $Y_N$ by the constant correction factor K, an extremely involved multiplier logic would therefore have to be introduced. In order to obtain a correction factor K that is constant for all rotational angles $Z_o$, the "zero decision" can be replaced by a doubling of all iteration stages.

When, due to the ambiguity region U, an incorrect decision concerning the sign is made in an angle iteration stage, for example the stage IZ 1a, then the amount of the residual angle is enlarged instead of being reduced. In the following, double-up angle iteration stage, for example IZ 1b, a reliable sign decision is then guaranteed, so that the preceding iteration step is, in turn, canceled. The result across two stages then corresponds to the result of one stage having a "zero decision", with a difference that all stages are always executed and the factor K therefore remains constant for arbitrary input angles $Z_o$. This solution, however, leads to a considerable added expense for hardware due to the redundant design of each iteration stage. The proposals that have been presented proceed from the opinion that errors in the sign recognition should not be made in any stage in order to guarantee the convergency of the CORDIC algorithm. The convergency condition, however, can be more generally formulated as: in case of an incorrect sign decision in the angle iteration stage IZ i, all further angle iteration stages IZ i+1 through IZ n must satisfy the elimination of the error and keep the output $Z_N$ within the framework of a given accuracy g.

This formulation leads to a fixed relationship between the number of stages to be doubled (factor $p_j$) and the number of leading significances r that must be taken into consideration for the sign decision of each stage.

$$r \geq \max_{i=0}^{N-1}\left(2 - i - \text{ld}\left(\sum_{j=i+1}^{N} p_j * W_j - W_i + g\right)\right)$$

where $p_j = 1$ for a regular iteration stage and $p_j = 2$ for a redundant iteration stage.

When, for example, the residual angle should remain below $10^{-3}$ after N=11 stages, then at least nine leading signifcances must be utilized for sign estimating without redundant stages. When each stage is doubled up ($p_j = 2$), only two bits now have to be taken into consideration. When, by contrast, only all odd-numbered stages are doubled ($p_j = 1$ when j is an even number and $p_j = 2$ when j is an odd number), then four bits are adequate. This consideration leads to a compromise in the architecture between the obtainable data rate (r as small as possible) and the necessary chip surface (stage i as small as possible). When the convergency is guaranteed, then the plurality of iteration steps defines the obtainable accuracy at the outputs $X_n'$ and $Y_n'$. With the following inequality, the minimum number of iteration cycles N can be calculated for a given accuracy.

$$N \geq -ld(\tan(\acos(1-(\tfrac{1}{2}*g)^2)))$$

Given the desired accuracy of $g=10^{-3}$, $r=4$ leading significances result for the sign estimating in the exemplary embodiment illustrated in FIG. 3 and a number of $N=11$ angle iteration stages that are required results given doubling of all odd-numbered iteration stages.

The multiplier circuit MULK can be realized on a hard-wired basis since the multiplication always occurs with a constant correction factor. Due to the redundant stages, a modified correction factor K' results.

$$K' = \prod_{i=0}^{N} (1 + p_i * 2^{-2i})^{-\tfrac{1}{2}}$$

Given the selected configuration, a value of $K'=0.5387$ decimally and $K'=0.1000101000-1$ in the CSD code results. The representation in K' in the CSD code enables the realization of the multiplication with only three shift/addition operations corresponding to the significances differing from zero. The adder circuit VMA is executed either as a carry-look ahead adder (CLA) or as a carry-ripple adder (CRA), whereby the carry-look ahead adder CLA has the advantage of a higher processing speed and the carry-ripple adder CRA can be more easily modified in terms of word width. The CORDIC processor realized in 1.5 μm CMOS technology can be operated with clock frequencies up to, typically, 60 MHz.

FIG. 4 illustrates an excerpted view of an angle path of FIG. 3 composed of angle path base cells BCZ and detectors DET, shown in the region of the doubled first angle iteration stages IZ 1a and IZ 1b as well as of the following, regular angled iteration stage IZ 2. At the angle iteration stage IZ 1a, an input word $Z_{1b}'$ that is likewise composed of carry and sum words is formed in the cells BCZ 1a, 0, ... BCZ 1a, 12 according to the CORDIC calculating rule, being formed therein from the input words $Z_{1a}'$ composed of carry and sum words and the angle step $W_{1a}$ that is either inverted or noninverted by the sign signals sign $(Z_{1a}')$, $\overline{\text{sign}(Z_{1a}')}$. Parallel thereto, sign signals sign $(Z_{1b}')$, $\overline{\text{sign}(Z_{1b}')}$ for the following angle iteration stage IZ 1b are formed from the four most-significant bits in a detector DET 1a. The angle iteration stages IZ 1a and IZ 1b are identical. Due to the connection to the next iteration stage, a left shift by one bit occurs at the output of the redundant stages, for example, IZ 1b, as well as at the regular stage, this corresponding to a scaling with the factor 2.

The wiring of the base cells results from the evaluation of the following equation.

$$W_i' = -2^{i*} \atan(2^{-i})* \text{sign}(Z_i')$$

The following values result therefrom for the iteration stages:

$W_0' = 11.00110111000 * \text{sign}(Z_0')$
$W_1' = 11.00010010101 * \text{sign}(Z_1')$
$W_2' = 11.00000101001 * \text{sign}(Z_2')$
$W_3' = 11.00000001011 * \text{sign}(Z_3')$
$W_4' = 11.00000000011 * \text{sign}(Z_4')$
$W_5' = 11.00000000001 * \text{sign}(Z_5')$
$W_6' - W_{11}' = 11.00000000000 * \text{sign}(Z_1')$ When sign $(Z_i')$ is negative, all bits of the zero-one sequence of the expression $-2^{i*} \atan(2^{-i})$ must be inverted and one is added at the place of the lsbs. A fixed zero occupation (GND) of the lsbs $W_{o,o}'$, a respective fixed one occupation (VDD) of the isbs $W_{1,0}' \ldots W_{5,0}'$ thereby result and only the msb is respectively dependent on the sign signal sign $(Z_i')$ given $W_6'-W_{11}'$. In the case of regular stages and in the case of doubled stages, the Z inputs of the least significant angle path base cells $BCZ_{i,0}$ are connected to the output of the immediately-preceding angle path base cells.

FIG. 5 illustrates an excerpted view of the vector path of FIG. 3 in accordance with the invention comprising vector base cells $BCXY_{i,k}$ in the region of the regular vector iteration stage IXY 2, of the basic stage IXY 3a and of the redundant stage IXY 3b pertaining to the basic stage IXY 3a. The inputs $XY_{2,0} \ldots XY_{2,16}$ and the outputs $XY_{4,0} \ldots XY_{4,16}$ are formed of the lines for the carry and sum bits of the vector components X, Y. A respective vector path base cell (BCXY i, k) has its input side connected to the output lines for carry and sum bits $(XC_{i,k}, YC_{i,k}, XS_{i,k}, YS_{i,k})$ of the immediately-preceding vector path base cell (BCXY i−1, k), insofar as the immediately-preceding vector path base cell exists and, otherwise, either the input lines for carry bits or the input lines for sum bits at the input side given the vector path base cells (BCXY, 0, k) are connected to the processor input lines for inputting a starting vector $(X_o, Y_o)$.

In a vector iteration stage, the structure for realizing a shift operation comprises a respective vector path base cell $BCXY_{i,k}$ with its input side connected to the output lines for the carry and sum bits $XC_{i,k+1}$, $YC_{i,k+i}$, $XS_{i,k+i}$, $YS_{i,k+i}$ of an ifold more-significant, immediately-preceding vector path base cell $(BXY_{i-1, k+i})$ and, when this vector path base cell does not exist, has its input side connected to the most-significant, immediately-preceding vector path base cell $BXY_{i-1,116}$ (msb). In accordance with the equations set forth above, the input word $X_i$ must be added to or subtracted from the input word $Y_i$ shifted left i times in each vector iteration stage and vice-versa. In order to minimize the wiring expense for the shift operations between two stages, both data paths for X and Y are bit-by-bit interlaced with one another.

Figure 6:
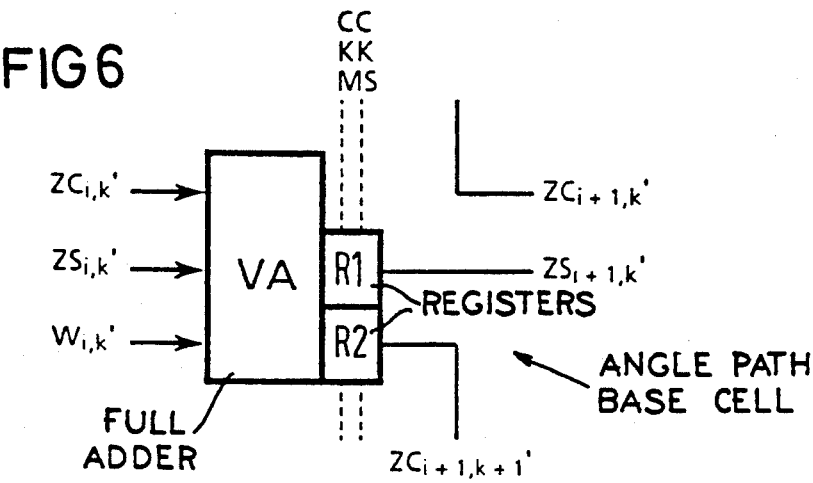
FIG. 6 is a schematic representation of an angle path base cell which may be employed in practicing the present invention.

FIG. 6 illustrates an angle path base cell BCZ of the present invention. The inputs of the angle path base cell correspond to the inputs of the full adder VA, whereby the one input of the full adder VA is connected to the input lines for an angle bit $W_{i,k}$ and two other inputs of the full adder VA are connected to the output lines for the carry and sum bits $ZC_{i,k}$, $ZS_{i,k}$ of the immediately-preceding angle path base cell $BCZ_{i-1, k}$ insofar as this preceding angle path base cell exists. When such a preceding angle path base cell does not exist, then the inputs of the full adder VA are respectively occupied with a logical "zero" (GND). For mutual decoupling of the vector iteration stages, $C^2MOS$ registers R1 and R2 are provided, these being clocked by the clock signals CKM and CKS. The clock generator CG mentioned in connection with FIG. 3 generates output signals CK 4, whereby these correspond to the clock signals CKM and CKS and to the clock signals respectively inverted relative thereto. The chronologically-offset clock signals CKM and CKS allow a data transfer according to the master-slave principle.

The output line for the carry bit $ZC_{i+1,k}$ comes from the next less-significant base cell BCZ i, k−1 and is only looped through the angle path base cell. The output bit line for the sum bit $ZS_{i+1,k}$ is connected to the output of the first register R1 that, in turn, has its input side connected to the sum output of the full adder VA. The output line for the carry bit $ZC_{i+1,k+1}$ is connected to the output of the second register R2 for forwarding to the next most-significant angle path base cell BCZ i, k1, this second register R2 having its input side, in turn, connected to the carry output of the full adder VA.

Figure 7:
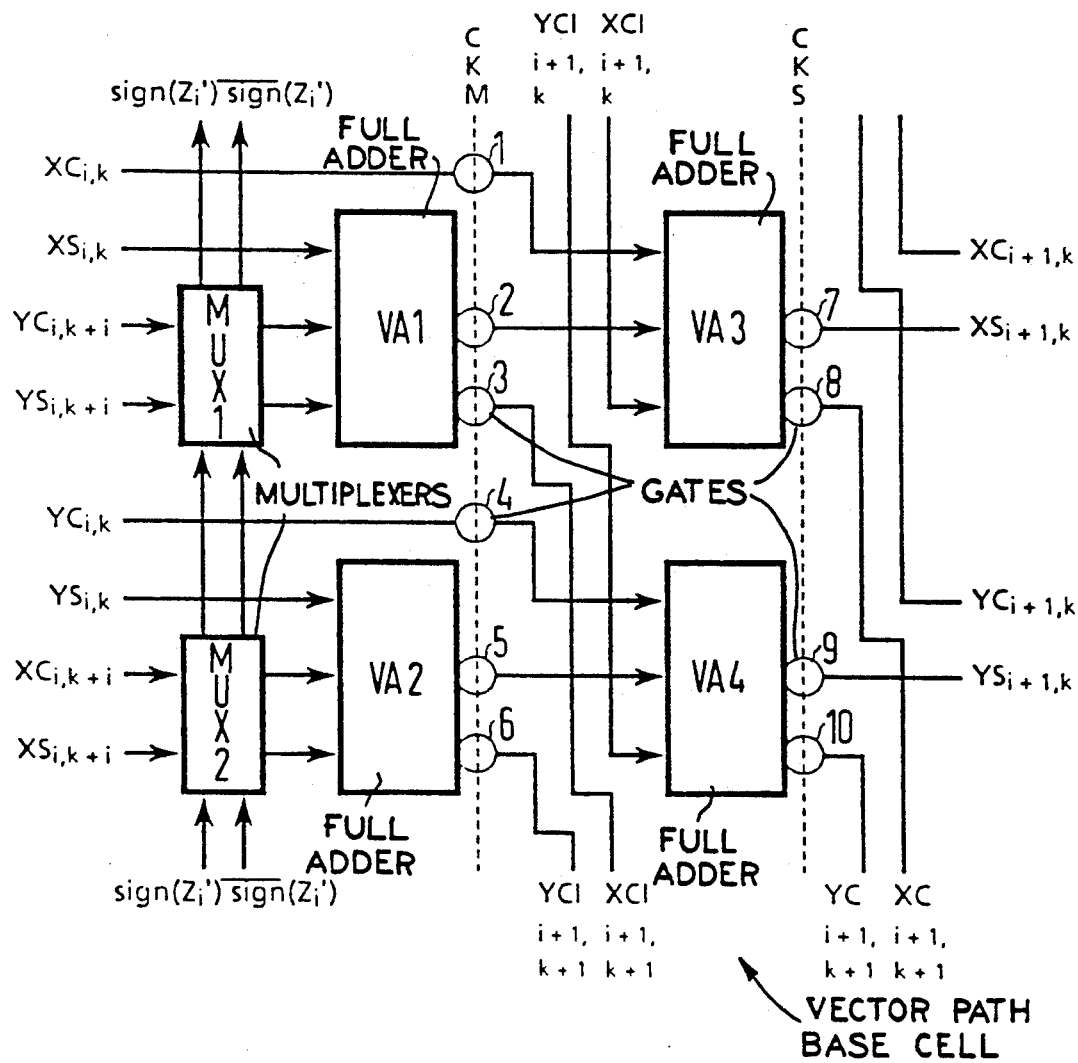
FIG. 7 is a schematic illustration of a vector path base cell which may be employed in practicing the present invention.

FIG. 7 illustrates a vector path base cell of the present invention that is composed of two multiplexers MUX 1 and MUX 2, four full adders VA1 ... VA4 and 10 transmission gates 1–10 for decoupling the vector iteration stages. An input line for the sum bit $SX_{i,k}$ of a first vector component X is connected to a first input of the first full adder VA1, and an input line for the sum bit $YS_{i,k}$ of a second vector component Y is connected to a first input of the second full adder VA2. An input line of the carry bit $XC_{i,k}$ of the first vector component X is connected to a first input of the third full adder VA3 via the first transmission gate 1 clocked by a first clock signal CKM, and an input line for the carry bit $YC_{i,k}$ of the second vector component Y is connected to a first input of the fourth full adder VA4 via the fourth transmission gate 4 that is likewise clocked by the first clock signal CKM. An input line for the i-times more-significant carry bit $YC_{i,k+i}$ of the second vector component Y of the second vector component Y is connected via the first multiplexer MUX1 to a second input of the first full adder VA1, and the i-times more significant sum bit $YS_{i,k+i}$ of the second vector component Y is connected to the third input of the first full adder VA1, likewise via the first multiplexer MUX1. The i-times more-significant carry bit $XC_{i,k+1}$ of the first vector component X is connected via the second multiplexer MUX2 to a second input of the second full adder VA2 and the i-times more-significant sum bit $XS_{i,k+i}$ of the first vector component is likewise connected to the third input of the second full adder VA2, likewise via the second multiplexer MUX2. The multiplexers MUX1 and MUX2 connect through the carry and sum bits of the immediately-preceding vector iteration stage to the full adder VA1 or, respectively, VA2 either inverter or noninverted dependent on the sign signals sign $(Z_i')$, sign $(Z_i')$. The sum output of the first full adder VA1 is connected via the second transmission gate 2 to a second input of the third full adder VA3 and the sum input of the second full adder VA2 is connected via the fifth transmission gate 5 to a second input of the fourth full adder VA4, whereby both transmission gates 2 and 5 are clocked by the first clock signal CKM. An output line for a first-stage carry bit $XCI_{i+1,k+1}$ of a first vector component is connected via the third transmission gate 3 to the carry output of the first full adder VA1, and an output line for a first-stage carry bit $YCI_{i+1,k+1}$ of the second vector component is connected via the sixth transmission gate 6 to the carry output of the second full adder VA2, whereby both transmission gates are clocked by the first clock signal CKM. An input line for a first-stage carry bit $XCI_{i+1,k}$ of a first of the first vector component X from the next less-significant vector path base cell BCXY i, k−1 is connected to the third input of the third full adder VA3, and an input line for a first-stage carry bit $YCI_{i+1,k}$ from the second vector component Y of the next less-significant vector path base cell BCXY i, k−1 is connected to the third input of the fourth full adder VA4. The input lines for second-stage carry bits $XC_{i+1,k}$, $YC_{i+1,k}$ of the vector component X and Y from the next less-significant vector path base cell BCXY i, k−1 are looped through onto the output lines for the immediate-following vector interaction stage of the vector path base cell VCXY i, k. The sum output of the third full adder VA3 is connected via the seventh transmission gate 7 to the output line for the sum bit $XS_{i+1,k}$ of a first component of the immediately-following interaction stage, and the sum output of the fourth full adder VA4 is connected via the ninth transmission gate 9 to the output line $YS_{i+1,k}$ for the sum bit of the second component of the immediately-following vector iteration stage, whereby the transmission gates 7 and 9 are clocked by the second clock signal CKS. An output line for a second-stage carry bit $XC_{i+1,k+1}$ of a first vector component is connected via the eighth transmission gate 8 to the carry output of the third full adder VA3, and an output line for a second-stage carry bit $YC_{i+1,k+1}$ of the second vector component is connected via the tenth transmission gate 10 to the carry output of the fourth full adder VA4, whereby the transmission gates 8 and 10 are clocked by the second clock signal CKS.

A simple realization of the logic for sign estimating is comprised in a carry ripple adder (CRA) for the four highest significances of $Z_i'$ whose sign is interpreted as the sign of the corresponding carry-save number. Since the four most-significant bits of the scaled angle steps $W_0' \ldots W_{11}'$, as set forth initially, all begin with the most-significant bits, 11,00, the four-bit ripple adder can be simplified to the optimized detector $DET_{opt}$ illustrated in FIG. 8. The sign estimating therefore occurs parallel to the addition of $Z_i'$ and $W_i'$ in order to therefore shorten the running time of the stage. As a result of the optimized sign detector $DET_{opt}$, a sign output signal $(Z_{i+1}')$ is formed from the foremost significant carry and sum bits $ZC_{i,9}$, $ZS_{i,9}' \ldots ZC_{i,12}'$, $ZS_{i,12}'$ of an immediately-preceding angle interaction stage IZ i−1 and of the non-inverted sign output signal sign $(Z_i')$ of an immediately-preceding angle iteration stage IZ i−1. The sign output signal sign $(Z_i')$ of the immediately-preceding angle iteration state is connected to one of the two inputs of an equivalence gate EQ and the output of the equivalence gate EQ is, in turn, connected to one of the two inputs of a first EXCLUSIVE-OR (EXOR) gate EX1. The most-significant carry and sum bots $ZC_{i,12}$, $ZS_{i,12}$ are operated with a second EXOR gate circuit EX2 and the output of the EXOR gate EX2 is connected to the second of the two inputs of the equivalence gate EQ. The second most-significance carry and sum bits $ZC_{i,11}'$, $ZS_{i,11}'$ are operated with a NOR gate, whereby the output of the NOR gate is connected to one of two OR inputs of a first OR-NAND gate ONA1, and these carry and sum bits are likewise operated with a first NAND gate NA1, whereby the output of the first NAND gate NA1 is connected to one of the two inputs of a second NAND gate NA2, and the output of the second NAND gate NA2 is connected to a direct NAND input of the first OR-NAND gate ONA1. The respective third most significant carry and sum bits $ZC_{i,10'}$, $ZS_{i,10'}$ are operated with the input OR gate of a second OR-NAND gate ONA2, whereby the output of the second OR-NAND gate ONA2 is connected to one of two OR inputs of a third OR-NAND gate ONA3. The third most-significant carry and sum bits are likewise operated by a third NAND gate NA3, whereby the output of the third NAND gate NA3 is connected to the direct NAND input of the second and third OR-NAND gate ONA2, ONA3. The fourth most-significant carry and sum bits $ZC_{i,9'}$, $ZS_{i,9'}$ are operated with a fourth NAND gate NA4. The output of the fourth NAND gate NA4 is connected to the OR input of the third OR-NAND gate ONA3, and the output of the third OR-NAND gate ONA3 is connected to the second OR input of the first OR-NAND gate ONA1 and to the second input of the second NAND GATE NA2. The output of the first OR-NAND gate ONA1 is connected to the second input of the first EXOR gate EX1, and the output of the first EXOR gate EX1 supplies the sign output signal SIGN $(Z_{i+1}')$ of the optimized sign detector $DET_{opt}$.

There is also the possibility of realizing the CORDIC algorithm for other modi (multiplication, division, square root or hyperbolic functions) in carry-save architecture. A universal CORDIC processor, controlled via all parameters, would therefore have to be operated in all modi, whereby Y or Z must be optionally iterated to zero. Farther-reaching convergency considerations have shown that a combination of the different modi in a processor with carry-save architecture is basically realizable.

Although we have described out invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A coordinate rotation digital computer processor for vector rotations, particularly for solving real-time processing of a vector of the vector components $X_0$, $Y_0$, by an angle $Z_0$, where $X_0$, $Y_0$ and $Z_0$ are each digital words having a plurality of data bits, said data bits having particular significances relative to one another, said processor comprising:
   - a vector path comprising a plurality of series-connected clocked vector iteration stages, a first of said vector iteration stages including vector inputs for exclusively receiving the vector components $X_0$, $Y_0$;
   - an angle path including a plurality of series-connected clocked angle iteration stages, a first of said angle iteration stages including angle inputs for exclusively receiving the data bits describing the angle $Z_0$;
   - a plurality of transmission gates between said vector iteration stages;
   - a plurality of registers between said angle iteration stages;
   - each of said vector iteration stages and said angle iteration stages comprising addition/subtraction circuits for providing, during a clock interval, only incomplete addition/subtraction operations with only intermediate results at the end of a clock interval in the form of a carry word of carry bits and a separate sum word of sum bits for further processing;
   - said plurality of vector iteration stages and said plurality of angle iteration stages each further comprising shift means for shifting the carry and sum bits;
   - said plurality of angle iteration stages further comprising sign detectors using the carry and sum bits to detect the sign of the respective intermediate results;
   - said plurality of series-connected vector iteration stages comprising a last stage of the series including inputs for the respective carry and sum words $XC_n$, $YC_n$, $XS_n$, $YS_n$;
   - a multiplier including respective inputs and outputs, said inputs connected to said outputs of said last stage of said plurality of series-connected vector iteration stages for multiplying the output carry and sum words of the respective vector components $XC_n$, $XS_n$, $YC_n$, $YS_n$ by a predetermined correction factor K; and
   - added means connected to said outputs of said multiplier for adding the carry and sum words output therefrom to form components of a result vector $X_N$, $Y_N$.

2. The coordinate rotation digital computer processor for vector rotations of claim 1, wherein each of said angle path iteration stages comprises:
   - a plurality of angle base cells each assigned a bit significance, said plurality of sign detectors respectively connected in parallel to certain ones of said angle base cells which are assigned at least a predetermined greater significance relative to an other angle base cell;
   - said angle base cells including inputs for receiving non-inverted and inverted sign signals from a respective immediately preceding angle path iteration stage, such sign signals corresponding to the product of the sign output signal of the immediately-preceding angle path iteration stage and a binary representation of a respective defined scaled negative angle step $(-2^i * \text{atan}(2^{-i}))$, and bits which cannot be modified by formation of said product are set to preselected constant values;
   - and wherein a shift operation is provided for scaling the carry and sum words at the output of an angle iteration stage in that said outputs for carry and sum bits of an angle base cell of one angle path iteration stage are connected to said inputs of the next more-significant angle base cell of the immediately-following angle path iteration stage.

3. The coordinate rotation digital computer processor of claim 1, wherein:
   - each angle base cell of the angle path iteration stage comprises a full adder including first and second outputs and a clocked sum bit register and a clocked carry bit register as outputs of said full adder, each of said registers including an input and an output;
   - inputs of said angle base cell constitute inputs of said full adder, one of said inputs receiving an angle bit, and the others of said inputs connected to said outputs for the carry and sum bits of immediately-preceding angle base cell and to selected logical values when an immediately-preceding angle base cell does not exist;
   - each angle base cell having an output connected to an output of a next less-significant angle base cell;

an output line for a sum bit is connected to said output of said sum bit register and said input of said sum bit register is connected to said first output of said full adder;

an output line for a carry bit is connected to said output of said carry bit register and said input of said carry bit register is connected to said second output of said full adder for forwarding the carry bit to a next more-significant angle base cell via said carry bit register.

4. The coordinate rotation digital computer processor of claim 1, wherein;

each of said vector iteration stages comprises a plurality of vector base cells each including inputs and outputs, said inputs connected to said outputs for carry and sum bits from an immediately-preceding vector path iteration stage, and, in a case of a first vector path iteration stage, to said inputs for receiving vector components of a vector to be rotated $X_0$, $Y_0$ as a starting vector;

each of said vector base cells having its inputs connected to said outputs for receiving the carry and sum bits of an i-times more significant, immediately-preceding vector path base cell when such a base cell exists, and to a most-significant, immediately-preceding vector base cell when such a base cell does not exist.

5. The coordinate rotation digital computer processor of claim 1, wherein:

at least one vector iteration stage and at least one angle iteration stage are redundantly provided in order to provide, given a required accuracy of a final result vector, greater ambiguity regions in sign detection in the individual angle iteration stages and in order to simultaneously enable an identical correction factor K for all combinations of processor input signals.

6. The coordinate rotation digital computer processor of claim 5, wherein:

a given accuracy and the number of redundantly-provided vector and angle iteration stages is such that four most significant carry and sum bits of a respective immediately-preceding angle iteration stage are required for sign detection.

7. A coordinate rotation digital computer processor for vector rotations, particularly for solving real-time processing of a vector of the vector components $X_0$, $Y_0$, by an angle $Z_0$, where $X_0$, $Y_0$ and $Z_0$ are each digital words having a plurality of data bits, said data bits having particular significances relative to one another, said processor comprising:

a vector path comprising a plurality of series-connected clocked vector iteration stages, a first of said vector iteration stages including vector inputs for receiving the vector components $X_0$, $Y_0$;

an angle path including a plurality of series-connected clocked angle iteration stages, a first of said angle iteration stages including angle inputs for receiving the data bits describing the angle $Z_0$;

a plurality of transmission gates between said vector iteration stages;

a plurality of registers between said angle iteration stages;

each of said vector iteration stages and said angle iteration stages comprising addition/subtraction circuits for providing, during a clock interval, only incomplete addition/subtraction operations with intermediate results at the end of a clock interval in the form of a carry word of carry bits and a sum word of sum bits for further processing;

said plurality of vector iteration stages and said plurality of angle iteration stages each further comprising shift means for shifting the carry and sum bits;

said plurality of angle iteration stages further comprising sign detectors using the carry and sum bits to detect the sign of the respective intermediate results;

said plurality of series-connected vector iteration stages comprising a last stage of the series including inputs for the respective carry and sum words $XC_n$, $YC_n$, $XS_n$, $YS_n$;

a multiplier including inputs and outputs, said inputs connected to said outputs of said last stage of said plurality of series-connected vector iteration stages for multiplying the output carry and sum words of the respective vector components $XC_n$, $XS_n$, $YC_n$, $YS_n$ by a predetermined correction factor K;

adder means connected to said outputs of said multiplier for adding the carry and sum words output therefrom to form components of a result vector $X_N$, $Y_N$ wherein each of said vector base cells comprises:

first and second multiplexers each including inputs and outputs;

first, second, third and fourth full adders each including inputs and outputs;

said transmission gates between said vector iteration stages including ten clocked transmission gates each including an input and an output;

an input line for a sum bit of a first vector component X connected to a first of said inputs of said first full adder;

an input line for a sum bit of a second vector component Y connected to a first input of said second full adder;

an input line for a carry bit of the first vector component X is connected to a first input of said third full adder via a first of said clocked transmission gates clocked by a first clock signal;

an input line for a carry bit of the second vector component Y is connected to a first input of said fourth adder via a fourth of said clocked transmission gates clocked by the first clock signal;

an input line for an i-times more-significant carry bit of the second vector component Y is connected to a first of said inputs of said first multiplexer and via said first multiplexer and a first output thereof to a second input of said first full adder;

an input line for an i-times more-significant sum bit of the second vector component Y is connected to a second input of said first multiplexer via said first multiplexer and a second output thereof to a third input of said first full adder;

an input line for the i-times more-significant carry bit of the first vector component X is connected to a first input of said second multiplexer and via said second multiplexer and a first output thereof to a second input of said second full adder;

an input line for the i-times more-significant sum bit of the first vector component X is connected to a second input of said second multiplexer and via said second multiplexer and a second input thereof to a third input of said second full adder;

said multiplexers connected to receive the sign bits from respective corresponding immediately-preceding angle path iteration stages and operable in response thereto to invert or non-invert carry and sum bits applied thereto depending on the sign signal;

said outputs of said full adders being a sum output and a carry output;

said output of said first full adder connected to said second input of said third full adder via a second of said clocked transmission gates;

said sum output of said second full adder connected to a second input of said fourth full adder via a fifth of said clocked transmission gates, said second and fifth transmission gates clocked by the first clock signal;

an output line for a first-stage carry bit of the first vector component X is connected via a third of said transmission gates as a carry output of said first full adder;

an output line for a first-stage carry bit of the second vector component Y is connected via a sixth of said transmission gates as a carry output of said second full adder, said second and sixth transmission gates clocked by the first clock signal;

an input line for a first-stage carry bit of the first vector component X from the next less-significant vector base cell is connected to a third output of said first full adder;

an input line for a first-stage carry bit of the second vector component Y of the next less-significant vector base cell is connected to a third input of said fourth full adder;

an input line for a second-stage carry bit of the first vector component X and the second vector component Y are looped through the vector base cell from a next less-significant vector base cell to provide outputs for an immediately-following vector iteration stage vector base cell;

said sum output of said third full adder is connected via a seventh of said clocked transmission gates as a cell output line for a sum bit of the first vector component X of an immediately-following vector iteration stage;

said output of said fourth full adder is connected via a ninth of said clock transmission gates as a cell output line for a sum bit of the second vector component Y of the immediately-following vector iteration stage, said seventh and ninth transmission gates being clocked by the second clock signal;

said carry output of said third full adder is connected via an eighth of said clocked transmission gates to provide a carry output line for a second-stage carry bit of the first vector component X; and said carry output of said fourth full adder is connected via a tenth of said clocked transmission gates to provide a carry output line for a second-stage carry bit of the second vector component Y, said eighth and tenth transmission gates being clocked by the second clock signal.

8. A coordinate rotation digital computer processor for vector rotations, particularly for solving real-time processing of a vector of the vector components $X_0$, $Y_0$, by an angle $Z_0$, where $X_0$, $Y_0$ and $Z_0$ are each digital words having a plurality of data bits, said data bits having particular significances relative to one another, said processor comprising:

a vector path comprising a plurality of series-connected clocked vector iteration stages, a first of said vector iteration stages including vector inputs for receiving the vector components $X_0$, $Y_0$;

an angle path including a plurality of series-connected clocked angle iteration stages, a first of said angle iteration stages including angle inputs for receiving the data bits describing the angle $Z_0$;

a plurality of transmission gates between said vector iteration stages;

a plurality of registers between said angle iteration stages;

each of said vector iteration stages and said angle iteration stages comprising addition/subtraction circuits for providing, during a clock interval, only incomplete addition/subtraction operations with intermediate results at the end of a clock interval in the form of a carry word of carry bits and a sum word of sum bits for further processing;

said plurality of vector iteration stages and said plurality of angle iteration stages each further comprising shift means for shifting the carry and sum bits;

said plurality of angle iteration stages further comprising sign detectors using the carry and sum bits to detect the sign of the respective intermediate results;

said plurality of series-connected vector iteration stages comprising a last stage of the series including inputs for the respective carry and sum words $XC_n$, $YC_n$, $XS_n$, $YS_n$;

a multiplier including inputs and outputs, said inputs connected to said outputs of said last stage of said plurality of series-connected vector iteration stages for multiplying the output carry and sum words of the respective vector components $XC_n$, $XS_n$, $YC_n$, $YS_n$ by a predetermined correction factor K;

adder means connected to said outputs of said multiplier for adding the carry and sum words output therefrom to form components of a result vector $X_N$, $Y_N$ wherein at least one vector iteration stage and at least one angle iteration stage are redundantly provided in order to provide, given a required accuracy of a final result vector, greater ambiguity regions in sign detection in the individual angle iteration stages and in order to simultaneously enable an identical correction factor K for all combinations of processor input signals and further wherein a given accuracy and the number of redundantly-provided vector and angle iteration stages is such that four most significant carry and sum bits of a respective immediately-preceding angle iteration stage are required for sign detection wherein each of said sign detectors comprises an optimized sign detector for all of said angle iteration stages which form a sign output signal of that sign detector from the four most-significant carry and sum bits of the respect immediately-preceding angle iteration stage and of a non-inverted sign output signal of the respective immediately-preceding angle iteration stage and, comprising:

an EQUIVALENCE gate including first and second inputs and an output, said second input connected to receive a sign output signal from an immediately-preceding angle iteration stage;

a first EXCLUSIVE-OR gate including a first input connected to said output of said EQUIVALENCE gate, a second input, and an output having the sign output signal of said sign detector;

a second EXCLUSIVE-OR gate including first and second inputs for respectively receiving the most-significant carry and sum bits, and an output connected to said first input of said EQUIVALENCE gate;

a NOR gate and a first NAND gate each including a first input connected to receive the second most-significant carry bit, a second input for receiving the second most-significant sign bit, and an output;

a second NAND gate including a first input connected to said output of said first NAND gate, a second input, and an output;

a first OR-NAND gate including a first input connected to said output of said NOR gate, a second input connected in common with said second input of said second NAND gate, and a third input connected to said output of said second NAND gate, and an output connected to said second input of said first EXCLUSIVE-OR gate;

a third NAND gate including first and second inputs respectively connected to receive the third most-significant carry and sum bits, and an output;

a second OR-NAND gate including a first input and a second input for respectively receiving the third most-significant carry and sum bits, a third input connected to said output of said third NAND gate, and an output;

a third OR-NAND gate including a first input connected to said output of said second OR-NAND gate, a second input connected with said third input of said second OR-NAND gate to said output of said third NAND gate, a third input, and an output connected to said second inputs of said first OR-NAND gate and said second NAND gate; and a fourth NAND gate including an output connected to said third input of said third OR-NAND gate, and first and second inputs respectively connected to receive the fourth most-significant carry and sum bits.

* * * * *